R. E. REED.
DIMMING DEVICE FOR REGULATING THE ELECTRIC LIGHTS OF AUTOMOBILES.
APPLICATION FILED AUG. 31, 1916.
1,235,244.
Patented July 31, 1917.
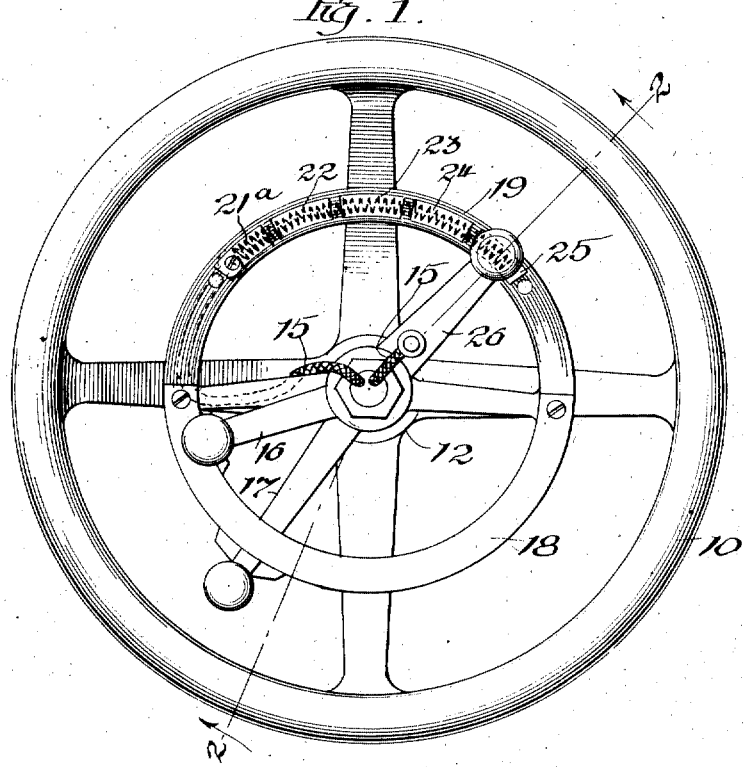
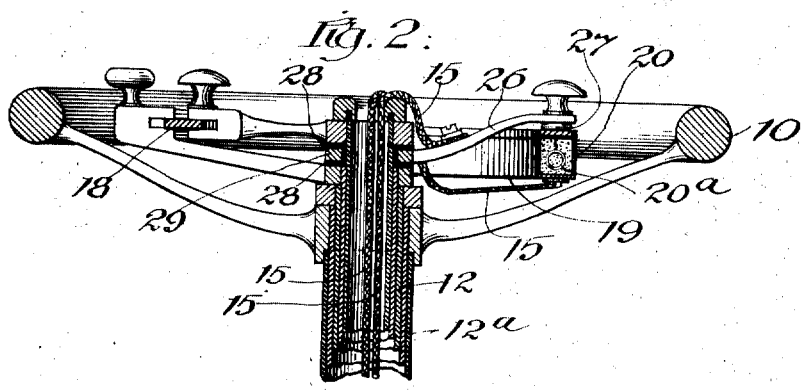
Witnesses:
Frank J Blanchard
Ethel A. Hulavich
Inventor:
Roy E. Reed
By Brown & Mehllope
Attys.

R. E. REED.
DIMMING DEVICE FOR REGULATING THE ELECTRIC LIGHTS OF AUTOMOBILES.
APPLICATION FILED AUG. 31, 1916.
1,235,244.
Patented July 31, 1917.
2 SHEETS—SHEET 2.
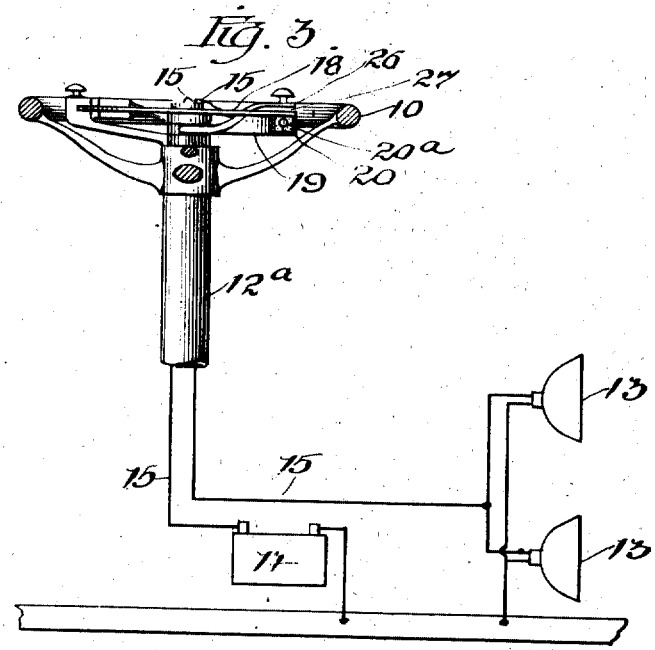
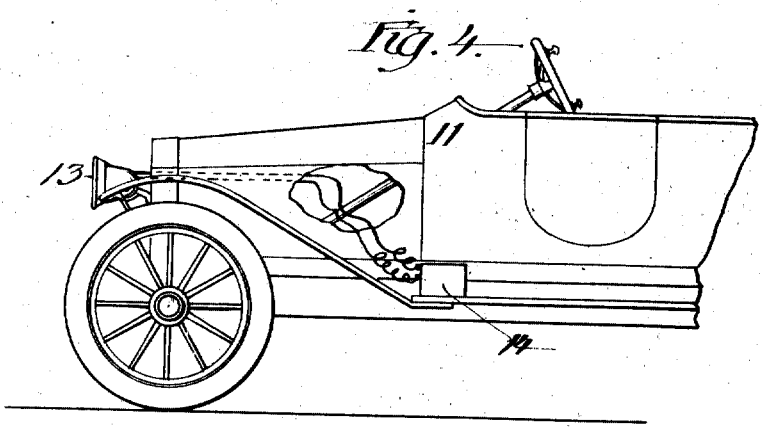
Witnesses:
Frank Blanchard
Ethel A. Krubwich
Inventor:
Roy E. Reed
By [signature]
Attys.

UNITED STATES PATENT OFFICE.

ROY E. REED, OF RIPON, WISCONSIN.

DIMMING DEVICE FOR REGULATING THE ELECTRIC LIGHTS OF AUTOMOBILES.

1,235,244.  Specification of Letters Patent.  Patented July 31, 1917.

Application filed August 31, 1916. Serial No. 117,836.

*To all whom it may concern:*

Be it known that I, ROY E. REED, a citizen of the United States, and a resident of Ripon, in the county of Fond du Lac and State of Wisconsin, have invented certain new and useful Improvements in Dimming Devices for Regulating the Electric Lights of Automobiles; and I do hereby declare that the following is a full, clear, and exact description thereof, reference being had to the accompanying drawings, and to the letters of reference marked thereon, which form a part of this specification.

This invention relates to a dimming device for regulating the electric lights of automobiles, motor boats, and other vehicles and machines, such as headlights and other lights, and consists of the matters hereinafter described and more particularly pointed out in the appended claims.

The object of the invention is to produce a dimming device of the kind described, which is of simple and economical construction, which is readily and easily applied to any motor vehicle construction and which is preferably supported in position conveniently located with reference to the steering wheel and to the usual engine-controlling members located thereon.

The advantages and simplicity of my improvement will appear as I proceed with my specification.

In the drawings:

Figure 1 is a view representing a top plan view of the steering wheel and post of an automobile provided with one form and arrangement of my improved dimming device.

Fig. 2 is a view representing a section through the same in a plane indicated by the line 2—2 of Fig. 1.

Fig. 3 is a diagrammatic view showing the wiring connection to the battery, lamps and steering post.

Fig. 4 is a fragmentary view of an automobile provided with my improved device.

My improved dimming device comprises in general a resistance unit or member which is placed in the electric circuit that supplies the head-lights of the machine and a controlling arm or member, associated with the resistance member in such manner that resistance, variable at the will of the operator, may be cut into the said electric circuit to vary the intensity of the lights.

The device is preferably located on the steering post or upon some part connected with the steering post, either above or below the steering wheel, so as to be conveniently placed at the hands of the driver when running the automobile or machine.

Referring now to that embodiment of the invention illustrated in the accompanying drawings: 10 indicates the steering wheel of an automobile 11; 12, 12ª indicate the steering post and its housing; and 13, 13 indicate the usual headlights. The lights are supplied from any suitable source of electric current, as by storage battery 14, which is connected to the lights in a familiar manner by line wires 15, 15; 16, 17 indicate the usual arms which control the spark and the throttle and 18 indicates the sector upon which said arms are mounted to rotate on the steering post as a center.

In the embodiment of the invention illustrated herein, the sector 18 is provided with an extension 19 which is attached in any convenient way and which as shown, is made of insulating material. A resistance box 20 (see Fig. 2) is attached to the said extension 19 and a plurality of contact members 21, 22, 23, 24, 25 are mounted on the extension and project through the same and into the resistance box where they are connected to the resistance coil 20ª therein, as in the case of a rheostat. An arm 26 is mounted to swing on the sector extension 19 about the steering post as a center. Said arm carries a contact button 27 which is adapted to engage the contacts 21—25 and establish electrical connection with one or the other of said contacts, depending upon the position of the arm 26.

The arm 26 is insulated from the part that it is connected with, in this case the steering post, in any usual manner as by the washers 28, 28, and the bushing 29. The line wires 15, 15 are extended up through the steering post and are connected, one to the arm 26 and the other to the resistance box 20 (see Figs. 1 and 2).

It is manifest from the foregoing description that as the arm 26 is moved in one direction to engage successive contacts of the series 21—25, the amount of resistance in the electric circuit supplying the headlights will be increased and that as the arm is swung in the opposite direction, the amount of resistance will be decreased. Thus will the lights be dimmed on the one hand, or will be brought to full power, on the other hand. The contacts and connections may be so arranged that at one end of the swing of the arm 26, the current will be completely shut off, thus completely extinguishing the lights. At the other end of the swing of the arm, the resistance may be completely cut out. This arrangement may be varied in many ways as will be apparent.

The electrical connections and insulation for the arm 26 and the resistance box, as shown herein, are for grounded systems as shown in Fig. 3. These will of course depend upon the system used in the car, machine or vehicle to which the device is to be applied.

In the claims, I use the words "steering post" as indicating any device, such as the post proper, its housings or other attachments, which support the steering wheel and upon which my resistance and controlling members may be directly or indirectly supported in convenient proximity to the steering wheel.

The advantages of my improved dimming device will be readily appreciated by those familiar with the art. The simplicity of arrangement, the few parts required, and the ease and convenience of manipulation to control the lights at all times are features which make it of value.

While in describing the one embodiment of my invention illustrated herein, I have referred to details of construction and arrangement, it will be understood that these may be modified in many ways and the invention is in no way to be limited thereby, except as pointed out in the appended claims.

The invention while illustrated and described with reference to an automobile, is, of course, applicable to motor-cycles, aeroplanes, motor boats and other motor driven vehicles, and in applying it to such other uses, slight modifications of attachment and arrangement will obviously be made, all of which are intended to be included within the scope of my invention as herein claimed.

I claim—

1. A dimming device for electric lights of automobiles and other motor vehicles, comprising in combination with the steering post, the steering wheel, the electric line wires in circuit with said lights, a sector member fixed on said steering post in the plane of the steering wheel, a resistance member attached to said sector member, a controlling arm mounted to swing about said steering post, the said line wires being connected respectively to said resistance member and to said controlling arm and said controlling arm being provided with a contact button, and arcuately spaced contacts fixed on said sector member and electrically connected to said resistance member, said controlling arm being adapted to engage through its contact button with the different contacts on said sector member to vary the resistance in said light circuit.

2. A dimming device for electric lights of automobiles and other motor vehicles, comprising in combination with the steering post, the steering wheel, the electric line wires in circuit with said lights, an arcuate resistance box attached to said steering post substantially in the plane of said steering wheel, a controlling arm mounted to swing about said steering post, the said line wires being connected respectively to said resistance box and to said controlling arm, and arcuately spaced contacts on said arcuate resistance box, said controlling arm being provided with a button to engage said contacts on said resistance box to vary the resistance in said light circuit.

3. A dimming device for electric lights of automobiles and other motor vehicles, comprising in combination with the steering post, the steering wheel, the throttle sector and the electric wires in circuit with said lights, an arcuate member attached to the ends of and forming a continuation of said throttle sector member, a resistance box fixed to said arcuate member, a controlling arm mounted to swing about said steering post, the said line wires being connected respectively to said resistance box and to said controlling arm, said controlling arm having a contact button, and spaced contact plates on said arcuate member electrically connected with the said resistance box, said controlling arm being adapted to engage through its contact button with the different contact plates on said arcuate member to vary the resistance in said light circuit.

In testimony, that I claim the foregoing as my invention I affix my signature in the presence of witnesses, this 25 day of August, A. D. 1916.

ROY E. REED.

Witnesses:
JOHN G. KAISER,
ROBERT REED,
W. R. DYSART.